(12) United States Patent
Park et al.

(10) Patent No.: US 10,474,832 B2
(45) Date of Patent: Nov. 12, 2019

(54) METHOD FOR CONTROLLING FILE INPUT-OUTPUT IN VIRTUALIZATION SYSTEM

(71) Applicant: SOOSAN INT CO., LTD., Seoul (KR)

(72) Inventors: Hyoung Bae Park, Seoul (KR); Hoi Chan Jeong, Seoul (KR); Seung Hyun Seo, Seoul (KR); Jun Young Park, Seoul (KR)

(73) Assignee: Soosan Int Co., LTD, Seoul (KR)

( * ) Notice: Subject to any disclaimer, the term of this patent is extended or adjusted under 35 U.S.C. 154(b) by 6 days.

(21) Appl. No.: 15/574,780

(22) PCT Filed: May 30, 2016

(86) PCT No.: PCT/KR2016/005676
§ 371 (c)(1),
(2) Date: Nov. 16, 2017

(87) PCT Pub. No.: WO2016/195343
PCT Pub. Date: Dec. 8, 2016

(65) Prior Publication Data
US 2018/0150643 A1 May 31, 2018

(30) Foreign Application Priority Data
Jun. 1, 2015 (KR) .................. 10-2015-0077415

(51) Int. Cl.
*G06F 12/00* (2006.01)
*G06F 21/62* (2013.01)
(Continued)

(52) U.S. Cl.
CPC .......... *G06F 21/6218* (2013.01); *G06F 3/064* (2013.01); *G06F 3/0622* (2013.01);
(Continued)

(58) Field of Classification Search
CPC ... G06F 16/188; G06F 21/6218; G06F 3/0622
See application file for complete search history.

(56) References Cited

U.S. PATENT DOCUMENTS

2007/0043896 A1* 2/2007 Daruwala ........... G06F 12/1491
711/6
2008/0244206 A1 10/2008 Heo et al.
(Continued)

FOREIGN PATENT DOCUMENTS

KR  10-2008-0041436 A   5/2008
KR  10/2008/0089002 A   10/2008
(Continued)

OTHER PUBLICATIONS

International Search Report dated Sep. 1, 2016, issued in PCT Application No. PCT/KR2016/005676, filed May 30, 2016.
(Continued)

*Primary Examiner* — Baboucarr Faal
(74) *Attorney, Agent, or Firm* — Workman Nydegger

(57) ABSTRACT

The present invention relates to a technology that performs: checking an integrity of a paravirtualization agent before executing the paravirtualization agent; protecting the paravirtualization agent by obstructing the modulation of a memory region to which the paravirtualization agent is allocated; when file input-output is generated in the paravirtualization agent, transmitting information associated with the generated file input-output to a host-based file system protection service to inquire about accessibility; determining an authority for access to the generated file input-output through a reasoning engine in the host-based file system protection service; and transmitting a result of the determination to the paravirtualization agent, and processing the generated file input-output, thereby protecting a file in a file system.

14 Claims, 5 Drawing Sheets

(51) Int. Cl.
*G06F 16/16* (2019.01)
*G06F 3/06* (2006.01)
*G06F 21/51* (2013.01)
*G06F 21/53* (2013.01)
*G06F 9/455* (2018.01)
*G06F 21/57* (2013.01)
*G06F 16/188* (2019.01)

(52) U.S. Cl.
CPC .......... *G06F 3/0671* (2013.01); *G06F 9/4555* (2013.01); *G06F 16/16* (2019.01); *G06F 16/188* (2019.01); *G06F 21/51* (2013.01); *G06F 21/53* (2013.01); *G06F 21/575* (2013.01)

(56) References Cited

U.S. PATENT DOCUMENTS

| | | | | |
|---|---|---|---|---|
| 2010/0251363 | A1* | 9/2010 | Todorovic | G06F 21/53 726/22 |
| 2011/0141124 | A1* | 6/2011 | Halls | G06F 21/83 345/522 |
| 2011/0202706 | A1 | 8/2011 | Moon et al. | |
| 2014/0156960 | A1* | 6/2014 | Simoncelli | G06F 12/1458 711/163 |
| 2014/0282539 | A1* | 9/2014 | Sonnek | G06F 9/45558 718/1 |
| 2015/0026785 | A1 | 1/2015 | Soon-Shiong | |
| 2015/0052519 | A1* | 2/2015 | Yu | G06F 9/45541 718/1 |
| 2016/0006766 | A1* | 1/2016 | Joo | H04L 63/145 726/1 |
| 2016/0246681 | A1* | 8/2016 | Tsirkin | G06F 11/1451 |

FOREIGN PATENT DOCUMENTS

| | | |
|---|---|---|
| KR | 10/2011/0095051 A | 8/2011 |
| KR | 10-1072807 B1 | 10/2011 |
| KR | 2015-0003167 A | 1/2015 |

OTHER PUBLICATIONS

Written Opinion dated Sep. 1, 2016, issued in PCT Application No. PCT/KR2016/005676, filed May 30, 2016.

* cited by examiner

METHOD FOR CONTROLLING FILE INPUT-OUTPUT IN VIRTUALIZATION SYSTEM

TECHNICAL FIELD

The present invention relates to a method of protecting a paravirtualized agent and a file in a full virtualization system.

BACKGROUND ART

A lexical meaning of "virtualization" is defined as an "act of processing something unreal or ambiguous based on assumption that something unreal or ambiguous is a fact or an entity present in reality.

Herein, virtualization technology refers to "technology capable of installing and using a computer operating system without affecting a system structure or hardware".

The virtualization technology refers to technology proposed by IBM in 1970 ties to reduce a space of a main frame and cost at that time. However, the virtualization technology is currently in the spotlight by providing compatibility, flexibility, and security in addition to the cost saving effect. The virtualization technology may be applicable to various fields, such as a server virtualization for cloud computing, a desktop virtualization, a mobile virtualization, and the like.

A virtualization may be variously classified based on a configuration method and, generally, may be classified into a full virtualization and a Para virtualization.

The full virtualization refers to virtualization technology that virtualizes hardware and thus, does not require modification of a kernel.

On the contrary, the Para virtualization refers to virtualization technology that partially virtualizes hardware and needs to modify a guest operating system kernel to fit for an interface required by a virtual machine monitor (VMM).

The virtualization technology is used due to its security, which is based on a relatively high isolation feature of virtualization. In general, a virtualization environment includes a virtual machine and a virtual machine monitor or a hypervisor configured to manage the virtual machine. Each virtual machine is present in an isolated space. In particular, although a threat occurs in a virtual machine, the threat does not affect other virtual machines, excluding the corresponding virtual machine, and a virtual machine monitor.

However, security solutions used in an existing physical machine in a virtualization system have some constraints and a repetition rate of security threat is on the significant increase.

The security solutions have some constraints in the virtualization system since a plurality of operating systems is installed in a single virtualization system.

If hackers attack to access data at an operating system level using one of the operating systems installed in the virtualization system, it may be difficult to prevent the attack.

Accordingly, there is a need for technology capable of effectively monitoring and blocking an access to data.

DISCLOSURE OF INVENTION

Technical Goals

An aspect of the present invention provides a method and apparatus for protecting a paravirtualized agent in a paravirtualization system.

In detail, another aspect of the present invention also provides a method and apparatus for protecting and securing a paravirtualized agent by blocking a modulation of a memory area to which the paravirtualized agent is allocated and examining an integrity of the paravirtualized agent before the paravirtualization agent is executed.

In addition, still another aspect of the present invention also provides a method of inquiring about an accessibility by transmitting information on an occurring file input/output (I/O) to a host-based file system protection service (HFPS) in response to an occurrence of the file I/O in a paravirtualized agent, verifying a right to access the occurring file I/O through a reasoning engine in the HFPS, and process the occurring file I/O by transmitting a result of the verifying to the paravirtualized agent.

Technical Solutions

According to an aspect of the present invention, there is provided a paravirtualization system for protecting a paravirtualized agent, the system including a parser configured to parse a file system of a guest operating system (OS) before a virtual machine starts and verify an integrity of the paravirtualized agent, a host-based file system protection service (HFPS) configured to block a modulation of a memory area to which the paravirtualized agent is allocated when the paravirtualized agent has integrity based on a result of the verifying, the paravirtualized agent configured to operate in the virtual machine, and in response to an occurrence of a file input/output (I/O), inquire about an accessibility by transmitting information on the occurring file I/O, and a reasoning engine configured to verify a right to access the occurring file I/O, and transmit a result of the verifying of the occurring file I/O to the paravirtualized agent.

Here, the paravirtualized agent may be configured to block the occurring file I/O when the received result of the verifying of the occurring file I/O corresponds to an access denied, and perform the occurring file I/O when the received result of the verifying of the occurring file I/O corresponds to an access allowed.

Here, the reasoning engine may be configured to verify the right to access the information on the occurring file I/O from a file list set in advance to be a protection target stored in the reasoning engine, and the file list includes at least one of a file name, a file path, a right to access a file for each process, or information on a security policy.

Here, the HFPS may be configured to receive, from the paravirtualized agent, an address of the memory area to which the paravirtualized agent is allocated and a start time of the paravirtualized agent, and block the modulation by setting a right to access the memory area to which the paravirtualized agent is allocated to be read only.

Here, the paravirtualized agent and the HFPS may perform communication using a hypercall interface.

According to another aspect of the present invention, there is provided a method of protecting a paravirtualized agent in a paravirtualization system, the method including parsing a file system of a guest operating system (OS) before a virtual machine starts and verify an integrity of the paravirtualized agent, blocking a modulation of a memory to which the paravirtualized agent is allocated when the paravirtualized agent has integrity based on a result of the verifying, inquiring, in response to an occurrence of a file input/output (I/O) in the paravirtualized agent, about an accessibility by transmitting information on the occurring file I/O to a host-based file system protection service (HFPS), verifying a right to access the occurring file I/O through a reasoning engine in the HFPS, and transmitting a result of the verifying of the occurring file I/O to the paravirtualized agent.

Here, the method may further include blocking the occurring file I/O when the result of the verifying of the occurring file I/O received from the paravirtualized agent corresponds to an access denied, and perform the occurring file I/O when the received result of the verifying of the occurring file I/O corresponds to an access allowed.

Here, the verifying of the right to access the occurring file I/O may include verifying a right to access information on the occurring file I/O from a file list set in advance to be a protection target stored in the reasoning engine, and the file list may include at least one of a file name, a file path, a right to access a file for each process, or information on a security policy.

Here, the blocking of the modulation of a memory area to which the paravirtualized agent is allocated may include blocking the modulation by setting a right to access the memory area to which the paravirtualized agent is allocated to be read only when the HFPS receives, from the paravirtualized agent, an address of the memory area to which the paravirtualized agent is allocated and a start time of the paravirtualized agent.

Effects

According to example embodiments, it is possible to protect a paravirtualized agent by blocking a modulation of a memory area to which the paravirtualized agent is allocated and examining an integrity of the paravirtualized agent before the paravirtualization is executed, and effectively protect a file of a file system by inquiring about an accessibility by transmitting information on an occurring file input/output (I/O) to a host-based file system protection service (HFPS) in response to occurrence of the file I/O in the paravirtualized agent, verifying a right to access the occurring file I/O through a reasoning engine in the HFPS, and process the occurring file I/O by transmitting a result of the verifying to the paravirtualized agent.

BEST MODE FOR CARRYING OUT THE INVENTION

Figure 1:
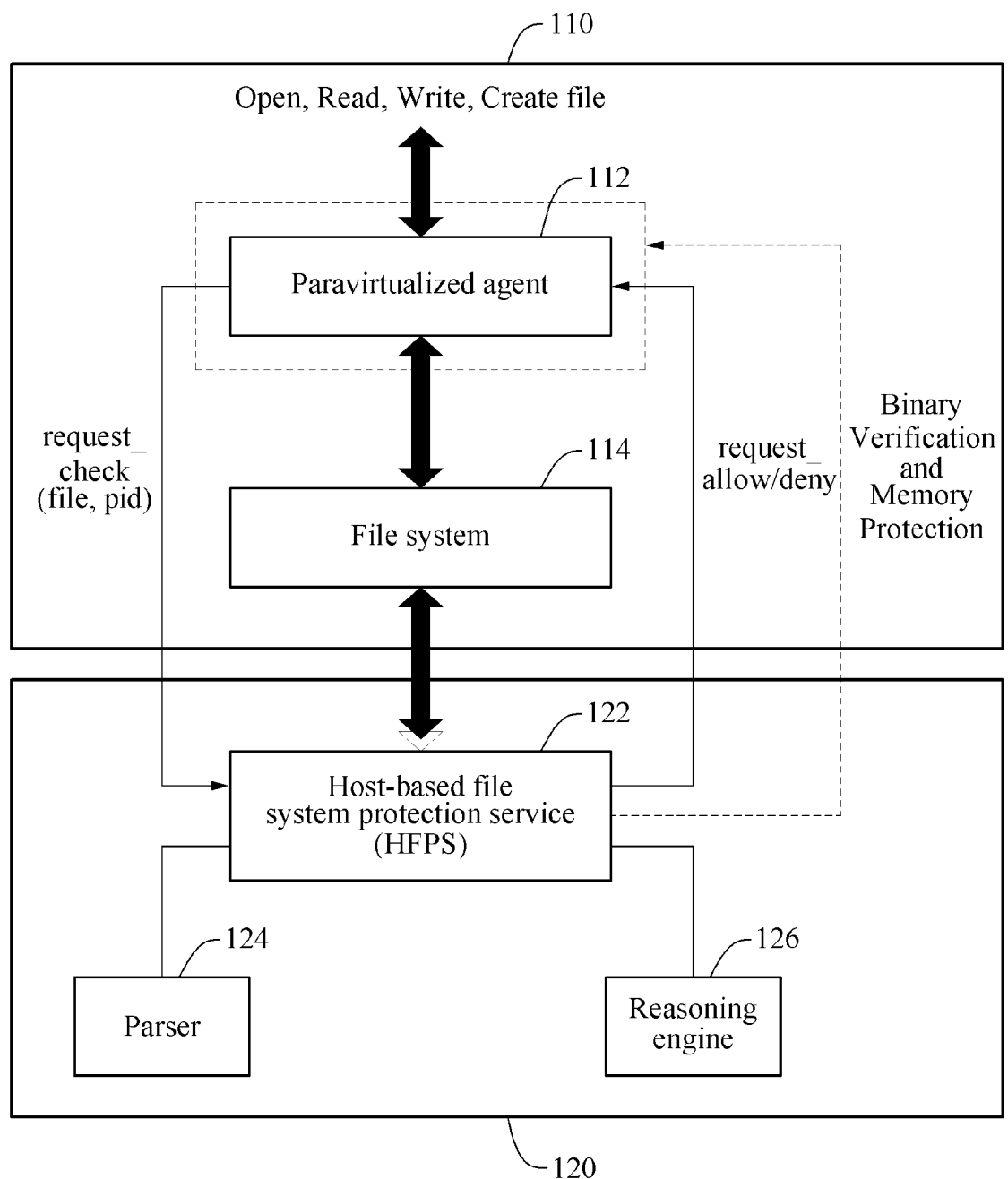
FIG. 1 is a diagram illustrating a configuration of a paravirtualization system for securing a resource of a file system and a paravirtualized agent according to an example embodiment.

Other aspects and features will be apparent from the following example embodiments, which are illustrated in the accompanying figures.

The example embodiments are described with reference to the accompanying drawings. In the description of example embodiments, detailed description of known related structures or functions will be omitted when it is deemed that such description will cause ambiguous interpretation of the present disclosure.

However, the present disclosure is not limited to or restricted by the example embodiments. Like drawing reference numerals refer to like elements.

Hereinafter, an apparatus and method for protecting a paravirtualized agent in a paravirtualization system according to an example embodiment is described with reference to FIGS. 1 through 5.

FIG. 1 is a diagram illustrating a configuration of a paravirtualization system for securing a resource of a file system and a paravirtualized agent according to an example embodiment.

Referring to FIG. 1, the paravirtualization system is largely divided into a virtual machine 110 and a host 120. Here, the virtual machine 110 includes a paravirtualized agent 112 and a file system 114, and the host 120 includes a host-based file system protection service (HFPS) 122, a parser 124, and a reasoning engine 126.

The paravirtualized agent 112 verifies an integrity by providing memory area information and a start time of the paravirtualized agent to the parser 124 through the HFPS 122 before the virtual machine starts. Here, a memory address corresponding to the memory area information of an agent may be obtained through a structure of a kernel and an application programming interface (API).

The paravirtualized agent 112 may be implemented irrelevant of an operating system (OS), but an implementation method may vary depending on the OS. For example, in a case of Windows, the paravirtualized agent 112 may be implemented through a file system minifilter driver. In a case of Linux, the paravirtualized agent 112 may be implemented through a kernel module.

The parser 124 parses a file system of a guest OS before the virtual machine 110 starts and verifies the integrity of the paravirtualized agent.

The HFPS 122 may block the modulation of the memory area to which the paravirtualized agent 112 is allocated when the paravirtualized agent has integrity based on a result of the verifying by the parser 124.

The HFPS 122 may block the modulation by setting a right to access the memory area to which the paravirtualized agent 112 is allocated to be read only using an address of the memory area to which the paravirtualized agent 112 is allocated and the received start time of the paravirtualized agent 112.

Figure 2:
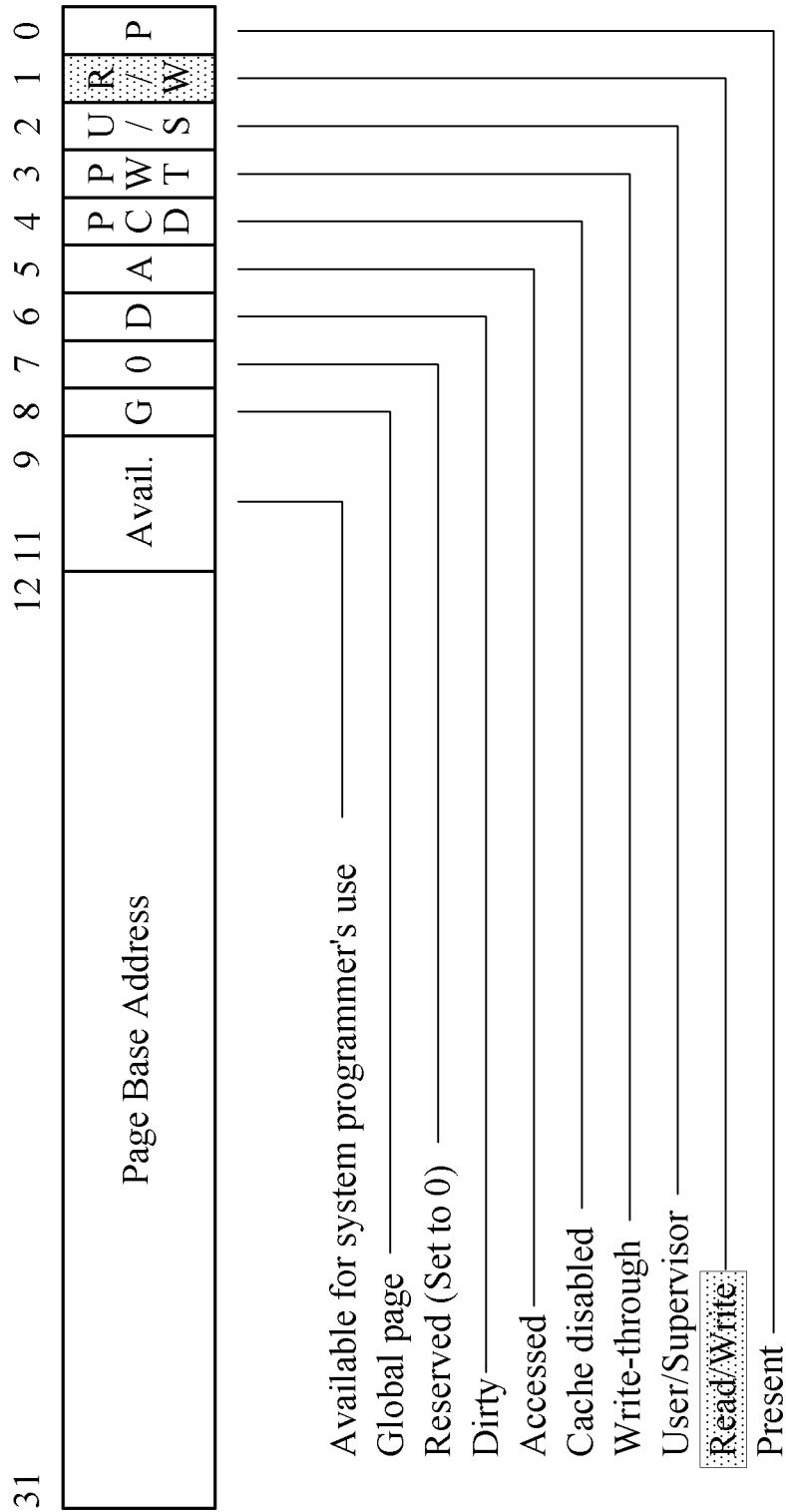
FIG. 2 illustrates a page table entry for performing correction to block a modulation of a memory area of a paravirtualized agent according to an example embodiment.

FIG. 2 illustrates a page table entry for performing correction to block a modulation of a memory area of a paravirtualized agent according to an example embodiment.

Referring to FIG. 2, the HFPS 122 may block the modulation by correcting a right to access (R/W bits) represented in shade in the page table entry to be read corresponding to write protection.

Meanwhile, to block the modulation of the memory area, an extended page table (EPT) being a memory virtualization technology may be used in case of Intel, and a nested page table (NPT) may be used in case of AMD.

The parser 124 may parse a file system of a guest OS before a virtual machine starts, verify an integrity of the paravirtualized agent, and provide a result of the verifying to the HFPS 122.

Meanwhile, in response to an occurrence of a file I/O, the paravirtualized agent 112 may inquire about an accessibility by transmitting information on the occurring file I/O to the HFPS 122.

When the HFPS 122 receives the information on the occurring file I/O from the paravirtualized agent 112, the HFPS 122 may request a verification on a right to access a file corresponding to the information on the occurring file I/O through the reasoning engine 126 and transmit a result of the verifying to the paravirtualized agent 112 when receiving the result of the verifying from the reasoning engine 126.

The reasoning engine 126 may verify the accessibility by verifying the right to access the information on the occurring file I/O from a file list set in advance to be a protection target. Here, the file list includes at least one of a file name, a file path, a right to access a file for each process, and information on a security policy, and the file list may be provided in a form of a database.

The paravirtualized agent 112 may receive a result of the verifying of the accessibility of the occurring file I/O from the HFPS 122, block the occurring file I/O when the result of the verifying of the occurring file I/O corresponds to an access denied, and perform the occurring file I/O when the received result of the verifying of the occurring file I/O corresponds to an access allowed.

Meanwhile, the paravirtualized agent 112 and the HFPS 122 may communicate each other through a hypercall interface.

Hereinafter, description about the method of protecting the paravirtualized agent in the paravirtualization system is provided with reference to drawings.

Figure 3:
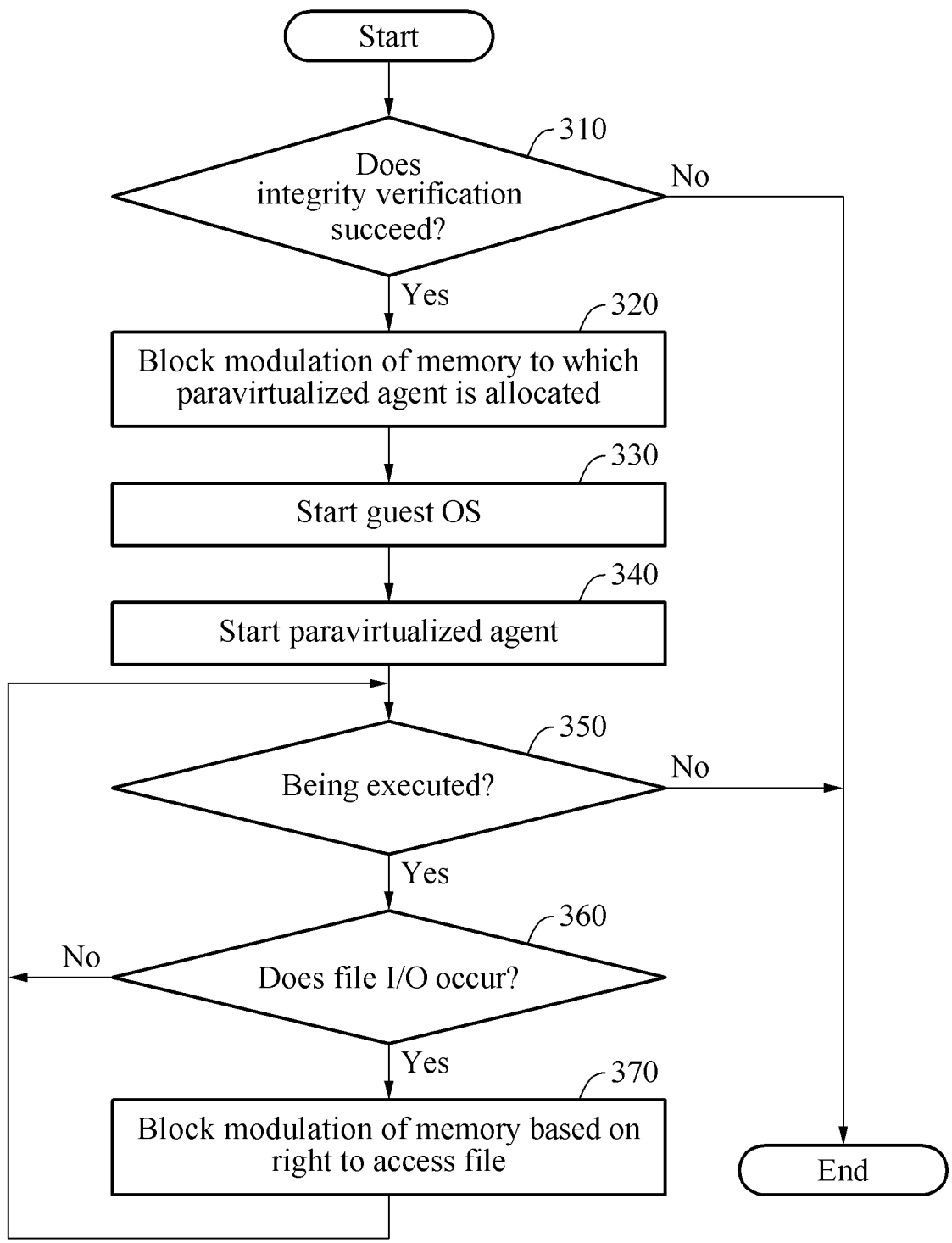
FIG. 3 is a flowchart illustrating a process of securing a resource of a file system and a paravirtualized agent in a paravirtualization system according to an example embodiment.

FIG. 3 is a flowchart illustrating a process of securing a resource of a file system and a paravirtualized agent in a paravirtualization system according to an example embodiment.

Referring to FIG. 3, in operation 310, a parser parses a file system of a guest OS before a virtual machine starts and verifies an integrity of the paravirtualized agent.

In operation 310, an HFPS blocks a modulation of a memory to which the paravirtualized agent is allocated when the paravirtualized agent has integrity based on a result of the verifying. Here, a method of blocking the memory may include a method of blocking the modulation by setting a right to access a memory area to which the paravirtualized agent is allocated to be read only.

An execution of the guest OS starts in the virtual machine in operation 330 and an execution of the paravirtualized agent starts in operation 340.

Subsequently, the paravirtualization system verifies whether the guest OS and the paravirtualized agent are being executed in operation 350.

Based on a result of the verifying that the guest OS and the paravirtualized agent are being executed in operation 250, the paravirtualized agent verifies whether a file I/O occurs in operation 360.

Based on a result of the verifying that the file I/O occurs in operation 360, the paravirtualized agent processes the occurring file I/O based on a right to access a file in operation 370.

Description about operation 370 in which the file I/O is processed in response to the occurring file I/O is provided below with reference to FIG. 4.

Figure 4:
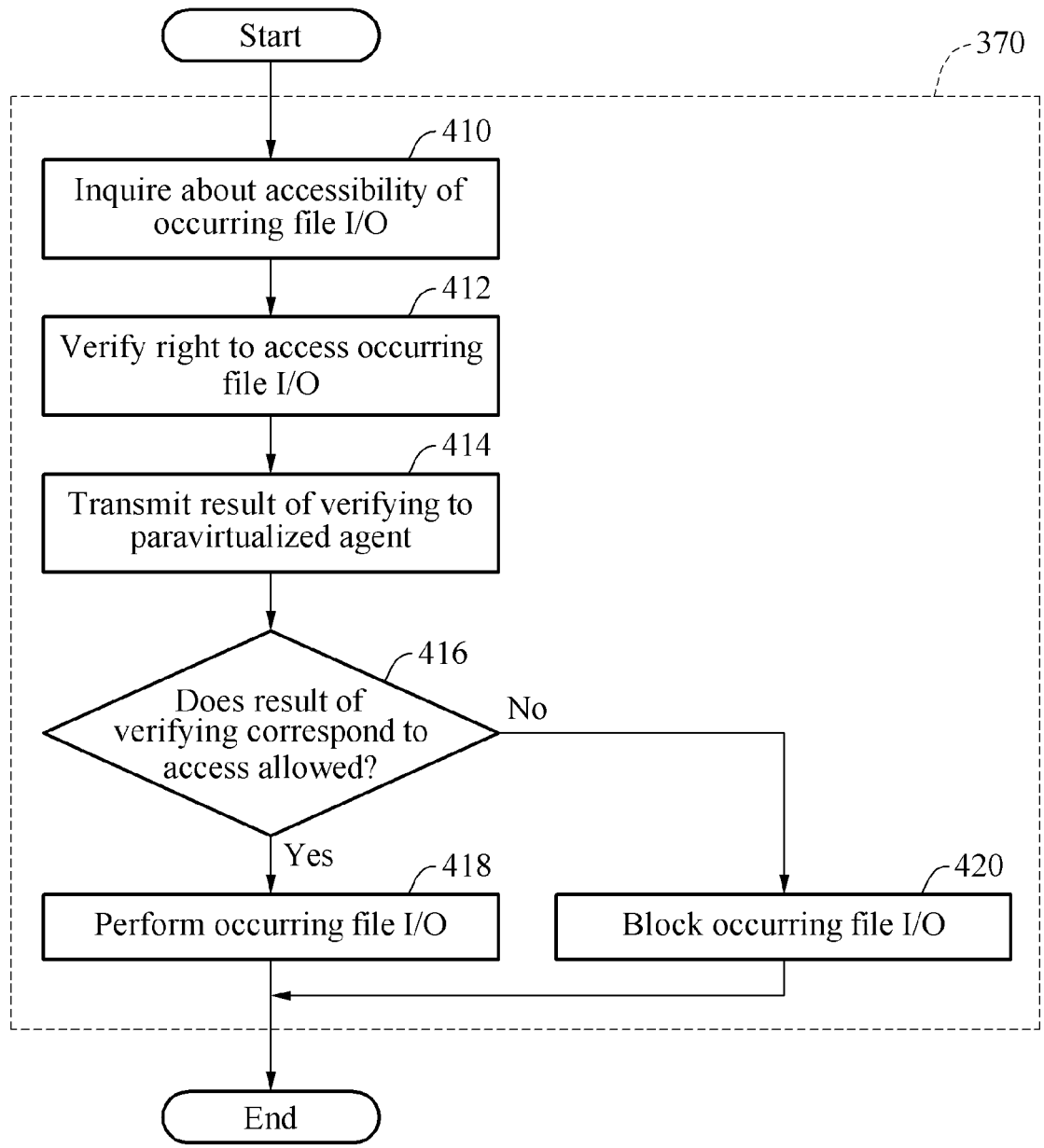
FIG. 4 is a flowchart illustrating a process of processing a file input/output (I/O) based on a right to access a file in a paravirtualization system according to an example embodiment.

FIG. 4 is a flowchart illustrating a process of processing a file input/output (I/O) based on a right to access a file in a paravirtualization system according to an example embodiment.

Referring to FIG. 4,
in operation 410, a paravirtualized agent inquires about an accessibility by transmitting information on an occurring file I/O to an HFPS.

In operation 412, the HFPS verifies a right to access the occurring file I/O through a reasoning engine.

In operation 414, the HFPS transmits a result of the verifying of the occurring file I/O to the paravirtualized agent.

In operation 416, the paravirtualized agent verifies whether the result of the verifying of the accessibility of the occurring file I/O corresponds to an access allowed.

Based on a result of the verifying that the result of the verifying of the occurring file I/O corresponds to the access allowed in operation 416, the paravirtualized agent performs the occurring file I/O in operation 418.

Based on the result of the verifying that the result of the verifying of the occurring file I/O corresponds to an access denied in operation 416, the paravirtualized agent blocks the occurring file I/O in operation 420.

Figure 5:
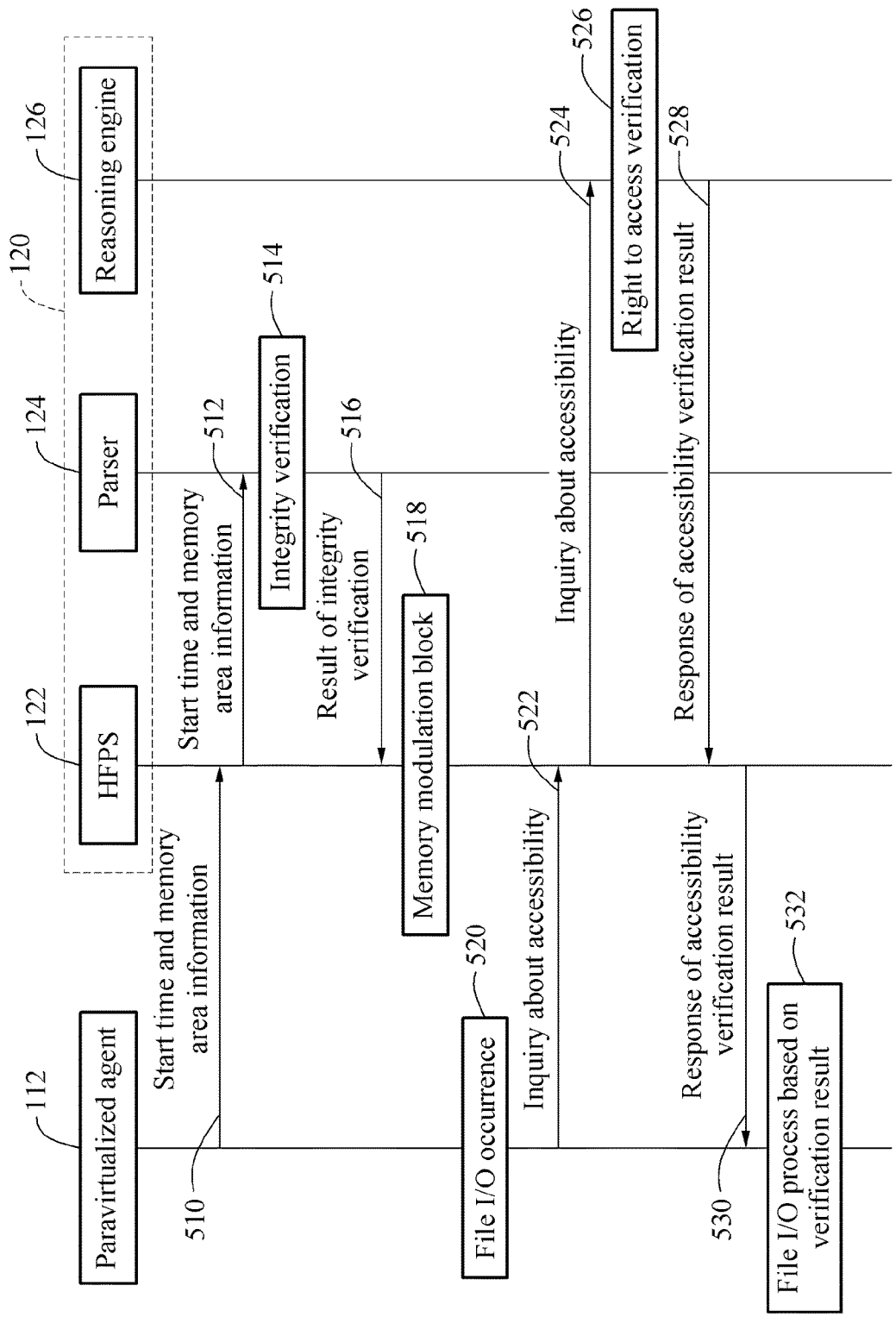
FIG. 5 illustrates a message flow for securing a resource of a file system and a paravirtualized agent in a paravirtualization system according to an example embodiment.

FIG. 5 illustrates a message flow for securing a resource of a file system and a paravirtualized agent in a paravirtualization system according to an example embodiment.

Referring to FIG. 5, in operation 510, the paravirtualized agent 112 transmits a start time and memory area information of the paravirtualized agent to the HFPS 122 before a virtual machine starts.

In operation 512, the HFPS 122 provides the start time and the memory area information of the paravirtualized agent for the parser 124.

In operation 514, the parser 124 parses a file system of a guest OS before the virtual machine 110 starts and verifies an integrity of the paravirtualized agent.

Also, in operation 516, the parser 124 provides a result of the verifying of the integrity for the HFPS 122.

In operation 518, the HFPS 122 blocks a modulation by setting a right to access a memory area to which the paravirtualized agent 112 is allocated to be read only when the paravirtualized agent has integrity based on a result of the verifying by the parser 124 such that a write is prohibited in the memory area.

Subsequently, when the file I/O occur in the paravirtualized agent 112 in operation 520, the paravirtualized agent 112 inquires about an accessibility by transmitting information on the occurring file I/O to the HFPS 122 in response to the occurrence of the file I/O in operation 522.

In operation 524, the HFPS 122 inquires about the accessibility by providing the information on the file I/O to the reasoning engine 524.

The reasoning engine 126 verifies the accessibility by verifying a right to access the information on the occurring file I/O from a file list set in advance to be a protection target in operation 526 and transmits a result of the verifying to the HFPS 122 in operation 528.

When the HFPS 122 receives the result of the verifying of the accessibility of the occurring file I/O from the reasoning engine 126, the HFPS 122 transmits the received result to the paravirtualized agent 112 in operation 530.

In operation 532, the paravirtualized agent 112 processes the occurring file I/O based on the result of the verifying of the accessibility of the occurring file I/O.

The method of protecting a paravirtualized agent in a paravirtualization system according to example embodiments may be recorded in non-transitory computer-readable recording media in a form of program instructions executable through a variety of computer devices. The media may include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of the non-transitory computer-readable media include magnetic media such as hard disks, floppy disks, and magnetic tape; optical media such as, CD-ROM and DVD; magneto-optical media such as optical media and floptical disks; and hardware devices that are specially configured to store and perform program instructions, such as ROM, RAM, flash memory, and the like. Examples of program instructions include both machine code, such as produced by a compiler a high language code that may be executed by the computer using an interpreter. The above-described hardware devices may be configured as one or more software modules in order to perform the operations of the example embodiments, or vice versa.

Although the description is made with reference to some example embodiments and drawings, they are provided only to assist in a comprehensive understanding of the present disclosure. Thus, the present disclosure is not limited to the example embodiments and it will be apparent to those skilled in the art that various modifications and changes may be made from the description.

Therefore, the scope of the disclosure is defined not by the example embodiments but by the claims and their equivalents, and all variations within the scope of the claims and their equivalents are to be construed as being included in the disclosure.

What is claimed is:

1. A paravirtualization system for protecting a paravirtualized agent, the system comprising:
    a parser configured to parse a file system of a guest operating system (OS) and to verify an integrity of the paravirtualized agent, wherein a virtual machine operates both the guest OS and the paravirtualized agent, and wherein the parser parses the guest OS's file system prior to the virtual machine being started so that verifying the integrity of the paravirtualized agent is performed before the paravirtualized agent is executed;
    a host-based file system protection service (HFPS) configured to block a modulation of a memory area to which the paravirtualized agent is allocated when the paravirtualized agent is determined to have integrity based on a result of the verifying, wherein blocking the modulation of the memory area is performed by:
        determining an execution start time of the paravirtualized agent, and
        prior to that execution start time, starting a process in which modulations are obstructed from being performed on the memory area such that the modulation is obstructed from being performed on the memory area even prior to the paravirtualized agent's execution start time;
    the paravirtualized agent, which is configured to operate in the virtual machine, and which, in response to an occurrence of a file input/output (I/O), is configured to inquire about an accessibility by transmitting information on the occurring file I/O; and
    a reasoning engine configured to verify a right to access the occurring file I/O and to transmit a result of the verifying of the occurring file I/O to the paravirtualized agent.

2. The system of claim 1, wherein the paravirtualized agent is configured to block the occurring file I/O when the result of the verifying of the occurring file I/O corresponds to an access denied and to perform the occurring file I/O when the received result of the verifying of the occurring file I/O corresponds to an access allowed.

3. The system of claim 1, wherein the reasoning engine is configured to verify the right to access the information on the occurring file I/O from a file list set in advance to be a protection target stored in the reasoning engine, and the file list includes at least one of a file name, a file path, a right to access a file for each process, or information on a security policy.

4. The system of claim 1, wherein the HFPS is configured to receive an address of the memory area to which the paravirtualized agent is allocated and the execution start time of the paravirtualized agent and to block the modulation by setting a right to access the memory area to which the paravirtualized agent is allocated to be read only.

5. The paravirtualization system of claim 1, wherein the paravirtualized agent is implemented through one of the following: a file system minifilter driver or a kernel module.

6. The paravirtualization system of claim 5, wherein the paravirtualized agent is implemented through the file system minifilter driver.

7. The paravirtualization system of claim 5, wherein the paravirtualized agent is implemented through the kernel module.

8. A method of protecting a paravirtualized agent in a paravirtualization system, the method comprising:
    parsing a file system of a guest operating system (OS) and verifying an integrity of the paravirtualized agent, wherein a virtual machine operates both the guest OS and the paravirtualized agent, and wherein the parser parses the guest OS's file system prior to the virtual machine being started so that verifying the integrity of the paravirtualized agent is performed before the paravirtualized agent is executed;
    blocking a modulation of a memory to which the paravirtualized agent is allocated when the paravirtualized agent is determined to have integrity based on a result of the verifying, wherein blocking the modulation of the memory area is performed by:
        determining an execution start time of the paravirtualized agent, and
        prior to that execution start time, starting a process in which modulations are obstructed from being performed on the memory area such that the modulation is obstructed from being performed on the memory area even prior to the paravirtualized agent's execution start time;
    inquiring, in response to an occurrence of a file input/output (I/O) in the paravirtualized agent, about an accessibility by transmitting information on the occurring file I/O to a host-based file system protection service (HFPS);
    verifying a right to access the occurring file I/O through a reasoning engine; and
    transmitting a result of the verifying of the occurring file I/O to the paravirtualized agent.

9. The method of claim 8, further comprising:
    blocking the occurring file I/O when the result of the verifying of the occurring file I/O corresponds to an access denied, or
    performing the occurring file I/O when the result of the verifying of the occurring file I/O corresponds to an access allowed.

10. The method of claim 8, wherein the verifying of the right to access the occurring file I/O comprises verifying a right to access information on the occurring file I/O from a file list, which is set in advance to be a protection target stored in the reasoning engine, and wherein the file list includes at least one of a file name, a file path, a right to access a file for each process, or information on a security policy.

11. The method of claim 8, wherein the blocking of the modulation of the memory area to which the paravirtualized agent is allocated comprises blocking the modulation by setting a right to access the memory area to which the paravirtualized agent is allocated to be read only when the HFPS receives, from the paravirtualized agent, an address of the memory area to which the paravirtualized agent is allocated and the execution start time of the paravirtualized agent.

12. A non-transitory computer-readable recording medium storing a program to implement the method according to claim 8.

13. The method of claim 8, wherein the paravirtualized agent and the HFPS perform communication using a hypercall interface.

14. The method of claim 8, wherein identifying the memory area to which the paravirtualized agent is allocated is performed by consulting a combination of both a kernel and an application programming interface.

* * * * *